United States Patent
Dalcher

(10) Patent No.: US 9,824,215 B2
(45) Date of Patent: *Nov. 21, 2017

(54) SYSTEM, METHOD, AND COMPUTER PROGRAM PRODUCT FOR MONITORING AND/OR ANALYZING AT LEAST ONE ASPECT OF AN INVOCATION OF AN INTERFACE

(71) Applicant: McAfee, Inc., Santa Clara, CA (US)

(72) Inventor: Gregory William Dalcher, Tigard, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/701,728

(22) Filed: May 1, 2015

(65) Prior Publication Data

US 2016/0026794 A1 Jan. 28, 2016

Related U.S. Application Data

(63) Continuation of application No. 14/042,235, filed on Sep. 30, 2013, now Pat. No. 9,027,132, which is a continuation of application No. 11/626,808, filed on Jan. 24, 2007, now Pat. No. 8,561,176.

(51) Int. Cl.
| | |
|---|---|
| *G06F 21/00* | (2013.01) |
| *G06F 21/56* | (2013.01) |
| *G06F 11/36* | (2006.01) |
| *G06F 21/53* | (2013.01) |
| *G06F 11/30* | (2006.01) |
| *G06F 21/55* | (2013.01) |

(Continued)

(52) U.S. Cl.
CPC ............ *G06F 21/56* (2013.01); *G06F 11/302* (2013.01); *G06F 11/3051* (2013.01); *G06F 11/3089* (2013.01); *G06F 11/3604* (2013.01); *G06F 11/3668* (2013.01); *G06F 21/53* (2013.01); *G06F 21/55* (2013.01); *G06F 21/50* (2013.01); *G06F 21/54* (2013.01); *G06F 2221/033* (2013.01)

(58) Field of Classification Search
CPC .......... H04L 63/12; H04L 63/14; G06F 21/05
USPC ............................... 726/22–25; 713/187–188
See application file for complete search history.

(56) References Cited

U.S. PATENT DOCUMENTS

| | | |
|---|---|---|
| 5,526,485 A | 6/1996 | Brodsky |
| 5,974,549 A | 10/1999 | Golan |
| 5,987,610 A | 11/1999 | Franczek et al. |

(Continued)

FOREIGN PATENT DOCUMENTS

WO  2013/025323  2/2013

OTHER PUBLICATIONS

Chen, Hao, and David Wagner. "MOPS: an infrastructure for examining security properties of software," Proceedings of the 9th ACM conference on Computer and communications security, ACM, 2002.

(Continued)

*Primary Examiner* — Madhuri Herzog
(74) *Attorney, Agent, or Firm* — Baker Botts L.L.P.

(57) ABSTRACT

A system, method and computer program product are provided. In use, execution of a portion of internal code of an interface is identified. Further, in response to the execution of the portion of internal code, at least one aspect of an invocation of the interface is monitored and/or analyzed.

20 Claims, 6 Drawing Sheets

(51) Int. Cl.
*G06F 21/50* (2013.01)
*G06F 21/54* (2013.01)

(56) References Cited

U.S. PATENT DOCUMENTS

| | | | |
|---|---|---|---|
| 6,073,142 A | 6/2000 | Geiger et al. | |
| 6,126,328 A * | 10/2000 | Mallory | G06F 9/4843 714/E11.21 |
| 6,327,700 B1 | 12/2001 | Chen et al. | |
| 6,412,071 B1 | 6/2002 | Hollander et al. | |
| 6,460,050 B1 | 10/2002 | Pace et al. | |
| 7,096,499 B2 | 8/2006 | Munson | |
| 7,127,707 B1 | 10/2006 | Mishra et al. | |
| 7,506,155 B1 | 3/2009 | Stewart et al. | |
| 7,587,724 B2 | 9/2009 | Yeap | |
| 7,987,451 B1 | 7/2011 | Dalcher | |
| 8,353,033 B1 | 1/2013 | Chen et al. | |
| 8,418,149 B2 * | 4/2013 | Krauss | G06F 11/3636 717/127 |
| 8,621,608 B2 | 12/2013 | Dalcher | |
| 2004/0133777 A1 | 7/2004 | Kiriansky et al. | |
| 2005/0071633 A1 | 3/2005 | Rothstein | |
| 2005/0091558 A1 * | 4/2005 | Chess | G06F 21/53 714/38.13 |
| 2005/0108562 A1 * | 5/2005 | Khazan | G06F 11/3604 726/23 |
| 2005/0177752 A1 * | 8/2005 | Hollander | G06F 9/4425 726/5 |
| 2005/0268338 A1 | 12/2005 | Made | |
| 2006/0021029 A1 | 1/2006 | Brickell et al. | |
| 2006/0156156 A1 | 7/2006 | Elnozahy | |
| 2006/0179483 A1 * | 8/2006 | Rozas | G06F 21/57 726/22 |
| 2006/0206937 A1 | 9/2006 | Repasi et al. | |
| 2007/0050781 A1 | 3/2007 | Furuichi et al. | |
| 2007/0240215 A1 | 10/2007 | Flores et al. | |
| 2009/0113111 A1 | 4/2009 | Chen et al. | |
| 2010/0011209 A1 | 1/2010 | Kiriansky et al. | |
| 2010/0064367 A1 | 3/2010 | Lysemose Hansen | |
| 2011/0083176 A1 | 4/2011 | Martynenko et al. | |
| 2012/0255000 A1 | 10/2012 | Sallam | |
| 2013/0047255 A1 | 2/2013 | Dalcher | |
| 2013/0275952 A1 | 10/2013 | Dalcher | |
| 2013/0276002 A1 | 10/2013 | Dalcher | |

OTHER PUBLICATIONS

Callahan et al., "Automated Software Testing Using Model-Checking," Publisher: West Virginia University, 1996, 9 pages.
Office Action received for U.S. Appl. No. 11/626,808, dated Jan. 29, 2010, 19 pages.
Office Action received for U.S. Appl. No. 11/626,808, dated Jul. 21, 2010, 23 pages.
Office Action received for U.S. Appl. No. 11/626,808, dated Feb. 2, 2012, 24 pages.
Office Action received for U.S. Appl. No. 11/626,808, dated Sep. 25, 2012, 32 pages.
Notice of Allowance received for U.S. Appl. No. 11/626,808, dated Jun. 17, 2013, 14 pages.
International Search Report and Written Opinion received for PCT Application No. PCT/US2012/048415, dated Dec. 10, 2012, 9 pages.
Dalcher, Greg, "System, Method and Computer Program Product for Analyzing Stack Call Frames that are Monitored While a Stack is Unwound," U.S. Appl. No. 11/749,635, filed May 16, 2007, 29 pages.
Office Action received for U.S. Appl. No. 13/211,999, dated Nov. 13, 2012, 13 pages.
Office Action received for U.S. Appl. No. 13/211,999, dated Mar. 1, 2013, 15 pages.
Office Action received for U.S. Appl. No. 13/211,999, dated Jul. 19, 2013, 10 pages.
Notice of Allowance received for U.S. Appl. No. 13/211,999, dated Dec. 11, 2013, 10 pages.

* cited by examiner

SYSTEM, METHOD, AND COMPUTER PROGRAM PRODUCT FOR MONITORING AND/OR ANALYZING AT LEAST ONE ASPECT OF AN INVOCATION OF AN INTERFACE

RELATED APPLICATION

This application is a Continuation of U.S. patent application Ser. No. 14/042,235 filed Sep. 30, 2013, which is a Continuation of U.S. patent application Ser. No. 11/626,808 filed Jan. 24, 2007, which are incorporated herein by reference in their entirety.

FIELD OF THE INVENTION

The present invention relates to monitoring/analyzing systems, and more particularly to monitoring/analyzing an invocation of an interface.

BACKGROUND

Increasingly, computer systems have needed to protect themselves against unwanted computer code. Such unwanted computer code has generally taken the form of viruses, worms, Trojan horses, spyware, adware, and so forth. To combat the dissemination of unwanted computer code, systems (e.g. intrusion detection systems, virus scanners, etc.) have been created for detecting such unwanted computer code.

In the context of these and other systems, interface monitoring has been utilized for detecting such unwanted computer code. Traditionally, such monitoring is triggered upon the execution of an initial portion of the interface. However, various counter-techniques are capable of avoiding the execution of the initial portion of the interface, while still providing for the execution of any remaining portion of the interface, thereby circumventing the interface monitoring all together.

There is thus a need for overcoming these and/or other issues associated with the prior art.

SUMMARY

A system, method and computer program product are provided. In use, execution of a portion of internal code of an interface is identified. Further, in response to the execution of the portion of internal code, at least one aspect of an invocation of the interface is monitored and/or analyzed.

DETAILED DESCRIPTION

Figure 1:
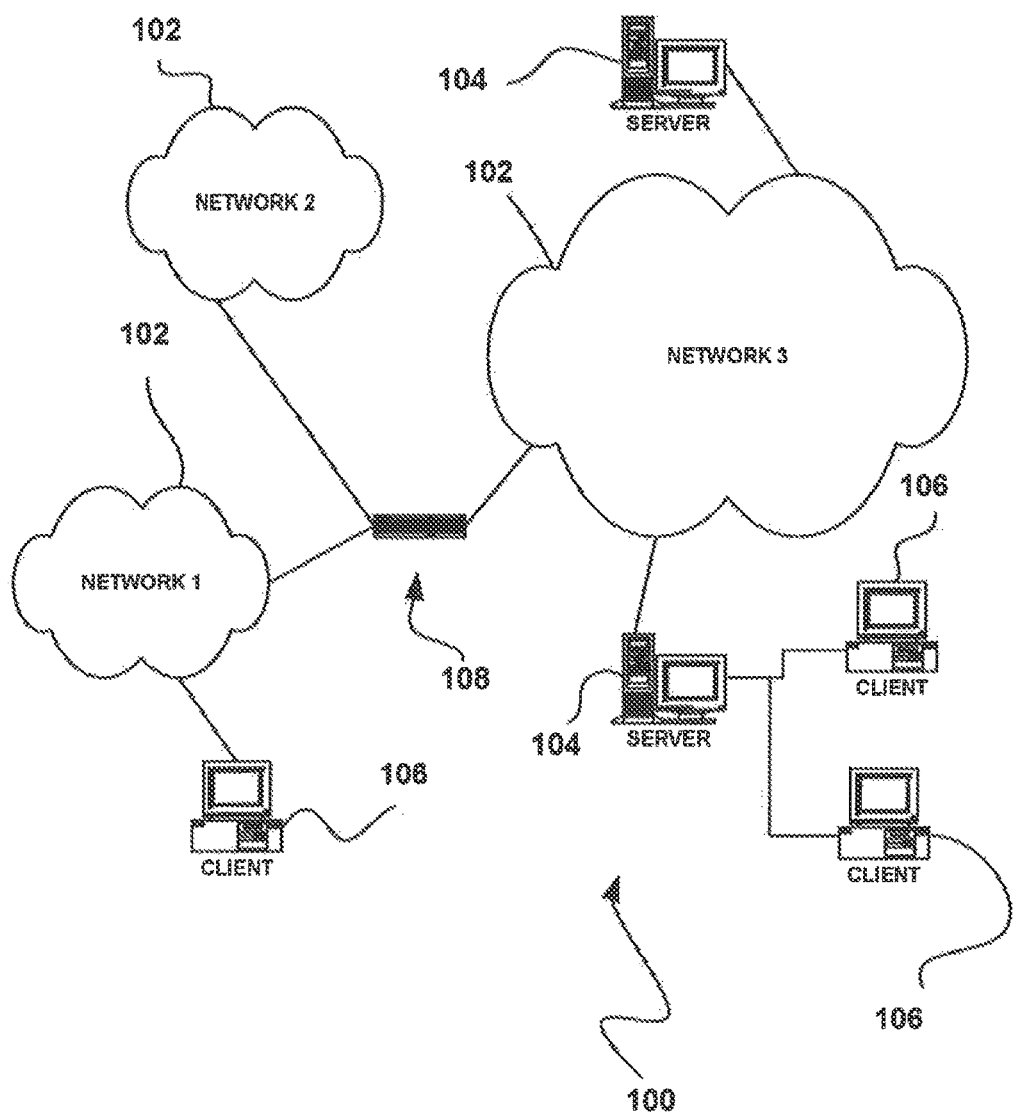
FIG. 1 illustrates a network architecture, in accordance with one embodiment.

FIG. 1 illustrates a network architecture 100, in accordance with one embodiment As shown, a plurality of networks 102 is provided. In the context or the present network architecture 100, the networks 102 may each take any form including, but not limited to a local area network (LAN), a wireless network a wide area network (WAN) such as the Internet, peer-to-peer network, etc.

Coupled to the networks 102 are servers 104 which are capable of communicating over the networks 102 Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that mater. In order to facilitate communication among the networks 102, at least one gateway 08 is optionally coupled therebetween.

Figure 2:
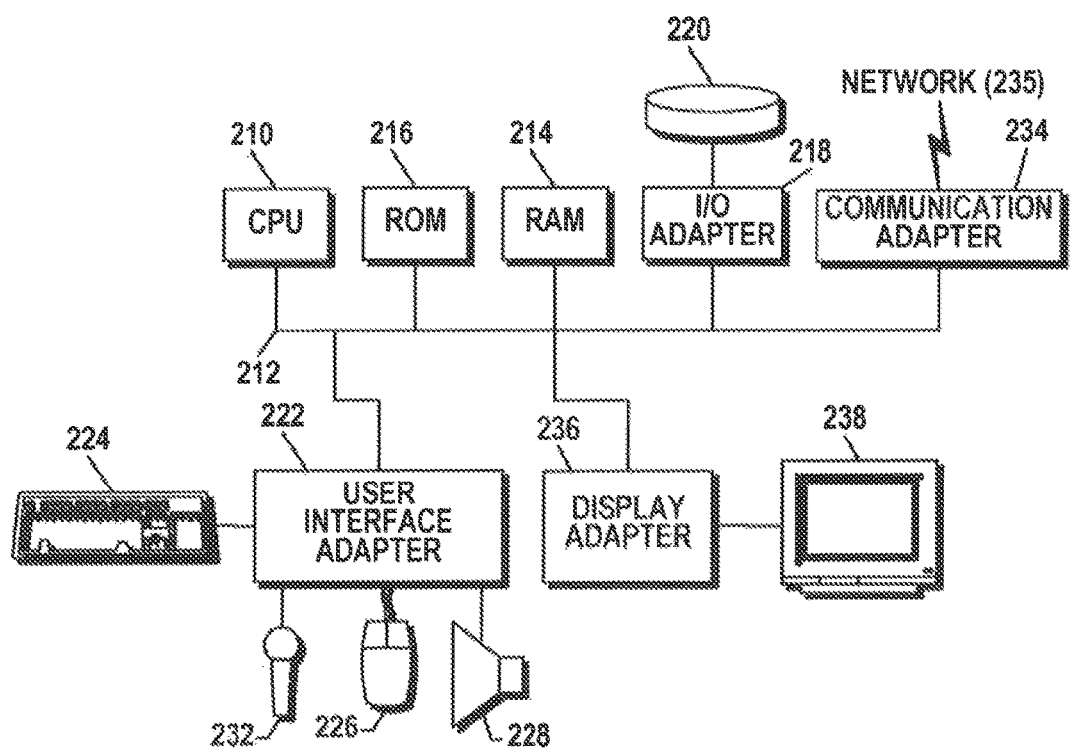
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications Of course, the various embodiments set forth herein may be implemented utilizing hardware, software, or any desired combination thereof. For that matter, any type of logic may be utilized which is capable of implementing the various functionality set forth herein.

Figure 3:
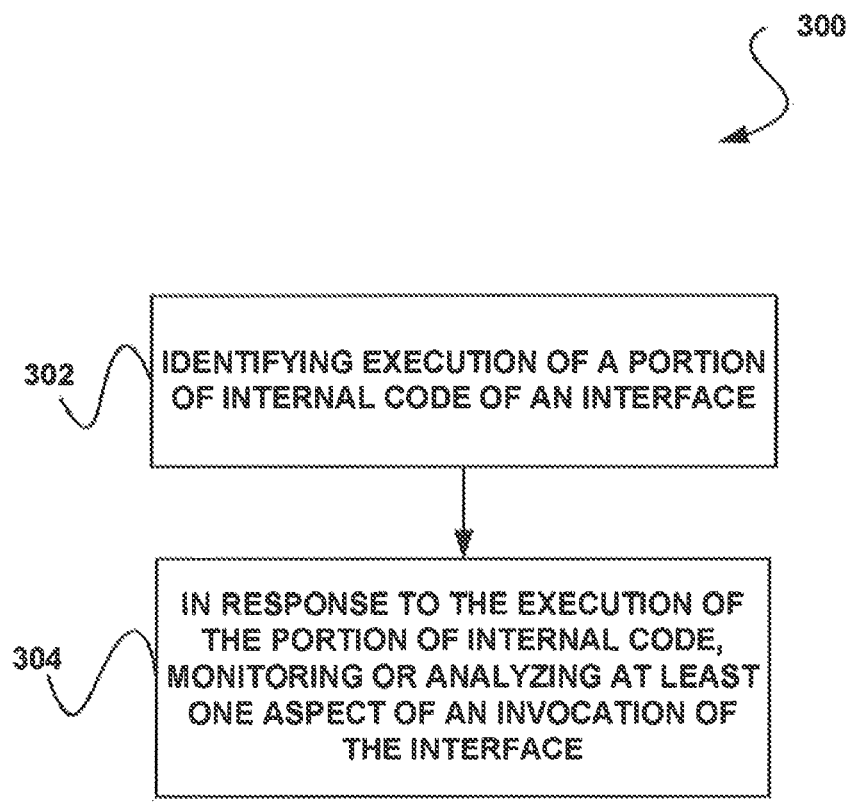
FIG. 3 shows a method for monitoring and/or analyzing at least one aspect of an invocation of an interface, in accordance with one embodiment.

FIG. 3 shows a method 300 for monitoring and/or analyzing at least one aspect of an invocation of an interface, in accordance with one embodiment. As an option, the method 300 may be carried out in the context of the architecture and environment of FIGS. 1 and/or 2. Of course, however, the method 300 may be carried out in any desired environment.

As shown in operation 302, execution of a portion of internal code of an interface is identified. In the context of the present description, the interface may include any computer code capable of interfacing at least two entities (e.g.

applications, hardware, etc.). In one embodiment, the interface may be utilized for communicating with, accessing, etc. a computer program. Just by way of example, the interface may include an application program interface (API), but of course may also include any interface meeting the above definition.

In addition, in the context of the present description, the internal code of the interface may include any code of the interface subsequent to initial code of the interface. For example, in different optional embodiments, the internal code may include any code subsequent to code utilized for executing an initial portion of the interface. Further, in one embodiment, such initial portion of the interface may include a beginning of the interface (e.g. a beginning portion of code of the interface including, but not limited to a first function, a first call, etc.). Thus, the portion of internal code of the interface may include any portion (e.g. section, etc.) of the internal code of the interface.

In one embodiment, the portion of internal code may be predetermined. In another embodiment, the portion of internal code may be determined during runtime Examples of determining such portions of internal code will be described in more detail with respect to FIG. 4, in the context of different embodiments. Of course, it should be noted that the portion of internal code may be determined in any desired manner.

Still yet, the execution of the portion of internal code may be identified in any desired manner. In one embodiment, the execution of the portion of internal code may be identified by identifying access to a target address associated with the portion of internal code. For example, such target address may include an address in memory in which the portion of internal code is stored. As another example, the target address may include an address in memory capable of being utilized to execute the portion of internal code (e.g. via a pointer, etc.).

In response to the execution of the portion of internal code, at least one aspect of an invocation of the interface is monitored and/or analyzed, as shown in operation 304. In one embodiment, the aspect of the invocation of the interface may include an invocation of an initial portion of the interface (e.g. beginning of the interface, etc.). In such embodiment, the monitoring and/or analyzing may optionally involve determining whether the initial portion of the interface was previously invoked.

Thus, it may be determined whether the initial portion of the interface was invoked prior to the execution of the portion of internal code of the interface. As another option, the monitoring and/or analyzing may include validating the invocation of the initial portion of the interface. Information regarding such validation will be described in more detail during the description of a different embodiment shown in operation 506 of FIG. 5.

In another embodiment, the aspect of the invocation of the interface may include an invocation of another portion of internal code of the interface. Just by way of example, the other portion of the internal code may include a previous portion of the internal code that precedes the portion of internal code of the interface for which the execution thereof was identified (in operation 302). Such previous portion of the internal code may, in one embodiment, reside after the aforementioned initial portion. Further, the monitoring and/or analyzing may include determining whether the other portion of internal code was previously invoked. Accordingly, it may optionally be determined whether portions of internal code are executed according to the sequence of such portions within the interface.

Of course, in the context of the present description, the monitored and/or analyzed aspect of the invocation of the interface may include absolutely any aspect capable of being associated with an invocation of the interface. In addition, it should be noted that any type of monitoring and/or analyzing may be performed with respect to the aspect of the invocation of the interface. Just by way of example, additional portions of the internal code of the interface that are subsequent to the portion of internal code for which execution was identified (see operation 302) may be monitored in response to such execution. As another example, any data associated with an invocation of the interface may be analyzed and/or monitored.

Furthermore, the monitoring and/or analyzing may be performed in any desired manner. In various embodiments, such monitoring and/or analyzing may be performed utilizing an in-line hook, a virtual machine, callback functions, and/or a hardware extension. Examples of implementing such various embodiments will be described in more detail with respect to FIG. 4. Of course, however, the monitoring and/or analyzing may be performed in any desired manner that is in response to operation 302.

Thus, in various optional embodiments, an aspect of an invocation of an interface may be monitored and/or analyzed in response to the execution of a portion of internal code of an interface. Accordingly, in one optional embodiment, an invocation of an interface that is performed in the absence of invoking a previous portion of the same interface may still be monitored and or analyzed. In this way, avoiding monitoring and/or analyzing of an invocation of an interface by bypassing an invocation of a previous portion of the interface may be prevented.

More illustrative information will now be set forth regarding various optional architectures and features of different embodiments with which the foregoing method may or may not be implemented, per the desires of the user. It should be strongly noted that the following information is set forth for illustrative purposes and should not he construed as limiting in any manner. Any of the following features may be optionally incorporated with or without the exclusion of other features described.

Figure 4:
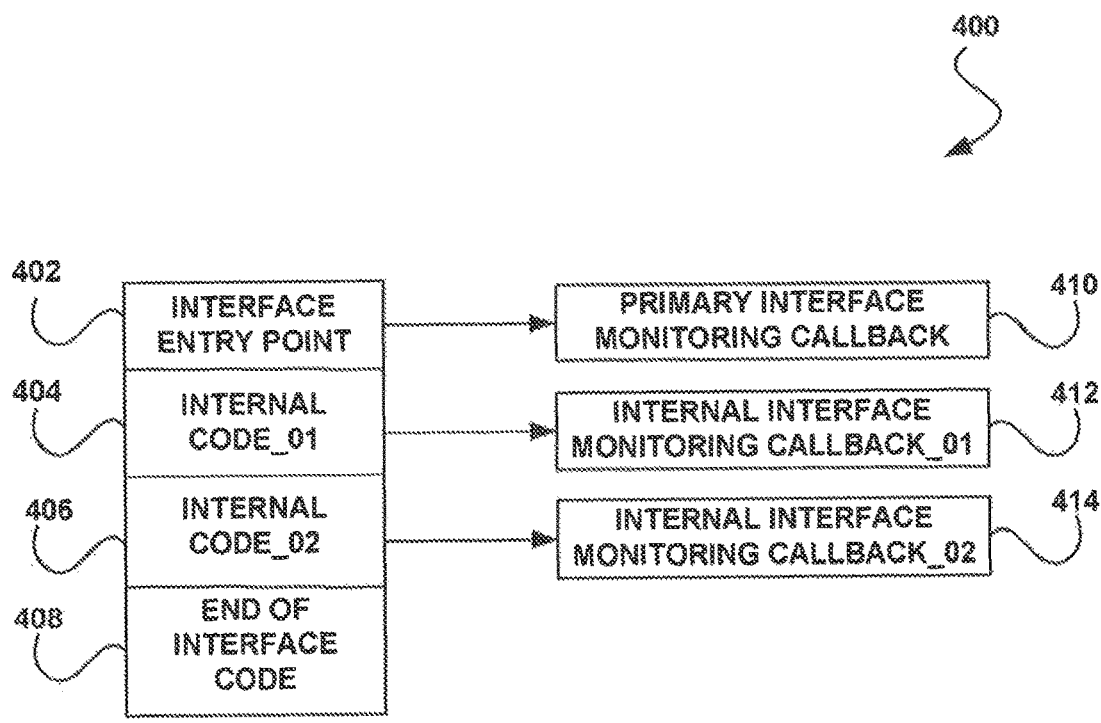
FIG. 4 shows a system for monitoring and/or analyzing at least one aspect of an invocation of an interface, in accordance with another embodiment.

FIG. 4 shows a system 400 for monitoring and/or analyzing at least one aspect of an invocation of an interface, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, an interface includes an interface entry point 402. The interface entry point 402 may include any beginning portion of code associated with the interface. Further, such beginning portion of code may be capable of being executed to invoke an initial portion of the interface. For example, the interface entry point 402 may include an initial sequence of one or more instructions within code of the interface.

The interface also includes portions of internal code (internal code_01 404 and internal code_02 406). The portions of internal code 404, 406 may be determined in any desired manner. In one embodiment, the portions of internal code 404, 406 may be predetermined. For example, the portions of internal code 404, 404 may be determined prior to any execution of the interface (e.g. invocation of the interface entry point 402, etc.). As another example, the portions of the internal code 404, 406 may be determined prior to any execution of a system in which the interface may be invoked. In one embodiment, such system may include a virtual machine (VM). More information regarding one exemplary embodiment of such VM will be described in more detail below.

In another embodiment, the portions of internal code 404, 406 may be determined during runtime. For example, the portions of internal code 404, 406 may be determined during execution of a system in which the interface ma be invoked (as described above). As an option, the portions of internal code 404, 406 may be determined at runtime utilizing a starting address of the interface, a length of the interface, and/or a validation that there is only one entry point to the interface. Of course, however, any desired information associated with the interface may be utilized for determining the portions of internal code 404, 406 at runtime.

In one embodiment, determining portions of internal code 404, 406 during runtime may allow such portions of internal code 404, 406 to be determined randomly during initialization of a system utilized for monitoring and/or analyzing the interface (e.g. intrusion prevention system, etc.). Accordingly, malware may he prevented from identifying the portions of internal code, the reasons for which will become apparent. In various other embodiments, the portions of internal code 404, 406 may be determined manually, automatically (programmatically, etc), etc. Of course, however, it should be noted that the portions of internal code 404, 406 may be determined in any desired manner.

As shown, the internal code_01 portion 404 is located within internal code of the interface at a location preceding the internal code_02 portion 406. Thus, during normal execution of the interface, the internal code_01 portion 404 is executed prior to the internal code_02 portion 406. Moreover, the internal code_01 portion 404 and internal code_02 portion 406 may be located anywhere within internal code of the interface. For example the internal code_01 portion 404 and internal code_02 portion 406 may be adjacent within the internal code of the interface. Of course, however, the internal, code_01 portion 404 and internal code_02 portion 406 may also be separated by other internal code of the interface. Further, the interface includes an end of interface code 408 which indicates an end of code utilized in executing the interface.

As also shown, the interface entry point 402 and the portions of internal code 404, 406 are each associated with a callback function (primary interface monitoring callback function 410, internal interface monitoring callback function_01 412, and internal interface monitoring callback function_02 414). Each callback function may include any function capable of being called. Further, the callback function may be called when a particular event occurs. For example, the callback function may include a function that is called when a memory region (e.g memory address, etc.) associated with the interface entry point 402 or portion of internal code (e.g. internal code_01 portion 404, internal code_02 portion 406, etc.) is accessed for execution.

The interface entry point 402 and the portions of internal code 404, 406 may each be associated with a callback function in any desired manner. In one exemplary embodiment, each callback function may be registered. With respect to the callback function 410 associated with the interface entry point 402, the registration of such callback function 410 may identify a memory address of the interface entry point 402 (whereby access to such memory address invokes the callback function 410), a number of parameters passed to the interface via an invocation of the interface entry point 402, and/or checksum of the interface.

Furthermore, with respect to callback functions 412, 414 associated with portions of internal code 404, 406, the registration of each callback function 412, 414 may identify a memory address of the associated portion of internal code 404, 406 and/or a checksum of the interface. Optionally, details (e.g. parameter locations, distance to the call stack frame, etc.) may not necessarily be provided for registration of callback functions 412, 414 associated with portions of internal code 404, 406. In this way, research needed to provide data for the registration of such callback functions 412, 414 may be simplified by only requiring identification of a memory address associated therewith. Of course, however, the registration of the callback functions 410, 412, 414 associated with the interface entry point 402 and the portions of internal code 404, 406 may include any desired information.

As another option, such registration data may be validated. For example, it may be determined whether a memory address associated with a callback function is located within the code of the interface. As another example, the checksum associated with a registered callback function may be utilized for ensuring the code of the interface has not been modified since registration of such callback function, and therefore the callback function is valid. For example, registered callback functions associated with portions of internal code may be validated by checking the checksum of the interface code with the checksum of the registered callback function. Accordingly, callback functions may be prevented from becoming infected due to modifications of the interface code made after registration of such callback functions, such as via hot-patching (which may alter in-memory contents of an executable image), or due to executable images for which version information is not updated, particularly where such registered callback functions are associated with predetermined portions of internal code. In this way, validation of registered callback functions may ensure the proper execution thereof.

Optionally, the callback functions 412, 414 associated with the portions of internal code 404, 406 determined at runtime may utilize another type of validation. For example, the callback functions 412, 414, and therefore the associated portions of internal code 404, 406 determined at runtime, may be programmatically validated at runtime by identifying all call instructions within the interface along with their associated transfer addresses. The call instructions and associated transfer addresses may then be compared against a particular portion of internal code associated with a registered callback function to determine if a control transfer may take place within the portion of internal code that would be replaced by the associated callback function.

For example, it may be ensured that a callback function replaces an instruction associated with a portion of code that is the suite length as the callback, function. In one embodiment, this may be accomplished by scanning from the start of the interface until an instruction of the same length as the callback function is identified. By starting the scan at the beginning of the interface code, ambiguity due to the use of variable length instructions may be avoided. In addition, by replacing an instruction with a callback function of the same length, control transfer front within the interface may be prevented from targeting a replaced instruction. Of course, it should be noted that this type of validation may similarly be utilized for initially determining portions of internal code to be associated with a callback function.

Additionally, the aforementioned callback functions 410, 412, 414 may be implemented with the interface entry point 402 and the portions of internal code 404, 406 in any manner. In one embodiment, the callback functions 410, 412, 414 may be implemented utilizing in-line hooks. For example, such in-line hook may include a control transfer instruction inserted within the code of the interface.

As an option, the in-line hook may replace the interface entry point 402 or portion of internal code 404, 406 associated with the callback function. Thus, when the associated interface entry point 402 or portion of internal code 404, 406 is accessed, the control transfer instruction located at the memory address associated with such access is executed. In this way, the control transfer instruction may be utilized to transfer control from execution of the interface to a monitoring and/or analyzing system associated with the callback function. In addition, the interface code replaced by the callback function may be stored, such that it may be executed as desired (e.g. by the system after any monitoring and/or analyzing is complete, etc.).

In another embodiment, the callback functions may be implemented utilizing a VM. The VM may include any representation of a complete software and hardware execution environment, whereby code executing therein is unaware it is not running natively on hardware (i.e. that it is, in fact, running in the VM). For example, a VM host associated with the VM may perform any monitoring and/or analyzing associated with the callback function. The VM host may optionally include hardware in which software (e.g. computer code) providing the VM executes.

Still yet, any code of the interface may be executed within a VM guest of the VM. Such VM guest may include an instance of the VM. Optionally, the VM guest may be self-contained, and may additionally be capable of running a discrete version of an operating system. Furthermore, a plurality of VM guests may he capable of existing simultaneously on the VM host, where each VM guest runs a different version of an operating system, as an option.

Thus, the VM may allow virtualization-enabled execution monitoring and/or analyzing of the interface utilizing callback functions. In addition, the VM may not necessarily require that code of the interface be modified (e.g. with inserted control transfer instructions, etc.) in order to implement such callback functions. In this way, monitoring and/or analyzing by way of callback functions may be performed transparently with respect to the interface executing within the VM guest and/or with respect to any third party software (e.g. malware, etc.). Thus, the VM may be utilized for monitoring and/or analyzing an aspect of an invocation of an interface with limited overhead beyond that incurred for the VM hosting.

Also with respect to virtualization-enabled execution monitoring (utilizing the VM), the callback function may be utilized for notifying third party software when the associated interface entry point 402 or portion of internal code 404, 406 is accessed for execution. Further, callback functions within the VM may be synchronous, may provide pre- and post-monitoring/analyzing of executions of code within the interlace, may allow for inspection of data and parameters associated with such monitoring/analyzing, may allow modification of such data and parameters, may terminate the execution of code of an interface, etc. Still yet, third party software receiving callback functions may optionally be running within the VM, but course may also be running outside of such VM (e.g. on a host machine associated with the VM, etc.).

Accordingly, in one embodiment, flexibility and robustness may optionally he provided with respect to monitoring/analyzing invocations of interfaces. As yet a further option, the portions of internal code 404, 406 of the interface to be associated with the callback functions 412, 414 may be determined at runtime, as described above, utilizing the VM. For example, a callback function may be determined while the VM guest is running within the VM.

In yet another embodiment, the callback functions may be implemented utilizing hardware extensions. Such hardware extensions may include, for example, central processing unit (CPU) extensions, etc. In use, the hardware extensions may be implemented in a manner similar to that described above with respect to the VM.

With continuing, reference to FIG. 4, upon invocation of the interface entry point 402, a primary interface monitoring callback function 410 is executed. Thus, in one embodiment, the primary interface monitoring callback function 410 may be executed in response to execution of an initial portion of the interface. The interface entry point 402 may be invoked by computer code separate from the interface. For example, the interface entry point 402 may be invoked by a computer program, malware, etc.

In another embodiment, the primary interface monitoring callback function 410 may provide monitoring and/or analysis of the invocation of the interface entry point 402. Information regarding the functionality of the primary interface monitoring callback function 410 will be described in more detail below with respect to FIG. 5. Optionally, the primary interface monitoring callback function 410 may return control to the interface such that execution thereof is allowed to continue.

In addition, in response to execution of the internal code_01 portion 404 of the interface, an internal interface monitoring callback function_01 412 is executed. In one embodiment, the internal code_01 portion 404 of the interface may be executed subsequent to the invocation of the interface entry point 402. In another embodiment, the internal code_01 portion 404 of the interface may be executed without any prior invocation of the interface entry point 402.

For example, the internal code_01 portion 404 of the interface may be executed by malware bypassing the invocation of the interface entry point 402. In one exemplary embodiment, such bypassing may be performed by executing a copy of interface code utilized in invoking the interface entry point 402 and transferring control from such copy to the remainder of actual interface code (i.e. internal code of the interface, course, however, the invocation of the interface entry point 402 may be bypassed in any desired manner.

The internal interface monitoring callback function_01 412 may be utilized for monitoring and/or analyzing any aspect of the invocation of the interface. The internal interface monitoring callback function_01 412 may determine whether the invocation of the interface entry point 402 was bypassed, for example. More information regarding the functionality of the internal interface monitoring callback function_01 412 will be described in detail with respect to FIG. 6.

Still yet, in response to execution of the internal code_02 portion 406 of the interface, another internal interface monitoring callback function_02 414 is executed. Again, it should be noted that the internal code_02 portion 406 may be executed sub Sequent to the invocation of the interface entry point 402 and the execution of the internal code_01 404 but, of course, may also be executed independently thereof (i.e. by bypassing, etc.).

The other internal interface monitoring callback function_02 414 may also be utilized for monitoring and/or analyzing any aspect of the invocation of the interface. For example, the other internal interface monitoring callback function_02 414 may determine whether the invocation of the interface entry point 402 and the execution of the internal code_01 portion 404 were bypassed. Thus, the internal interface monitoring callback function_01 412 and the other internal interface monitoring callback function_02 414 may each be utilized for monitoring and/or analyzing any aspect of the invocation of the interface. Also, similar to the internal interface callback function_01 412, more information regarding the functionality of the other internal interfacing monitoring callback function_02 414 will be described in detail with respect to FIG. 6.

It should be noted that, while two portions of internal code (internal code_01 404 and internal code_02 406) of an interface are shown, any number of internal interface monitoring callback functions may be utilized with respect to any number of different portions of internal code. In this way, a callback function may be invoked each time a determined portion of internal code of an interface is executed. Thus, at any desired point within the internal code of an interface, an internal interface monitoring callback function may be executed. As described above with respect to FIG. 3, the portions of internal code of an interface for which internal interface monitoring callback functions are executed may be predetermined, determined at runtime, etc. In this way, any aspect of an invocation of an interface may be monitored and/or analyzed in response to execution of any of such portions of internal code of the interface.

Figure 5:
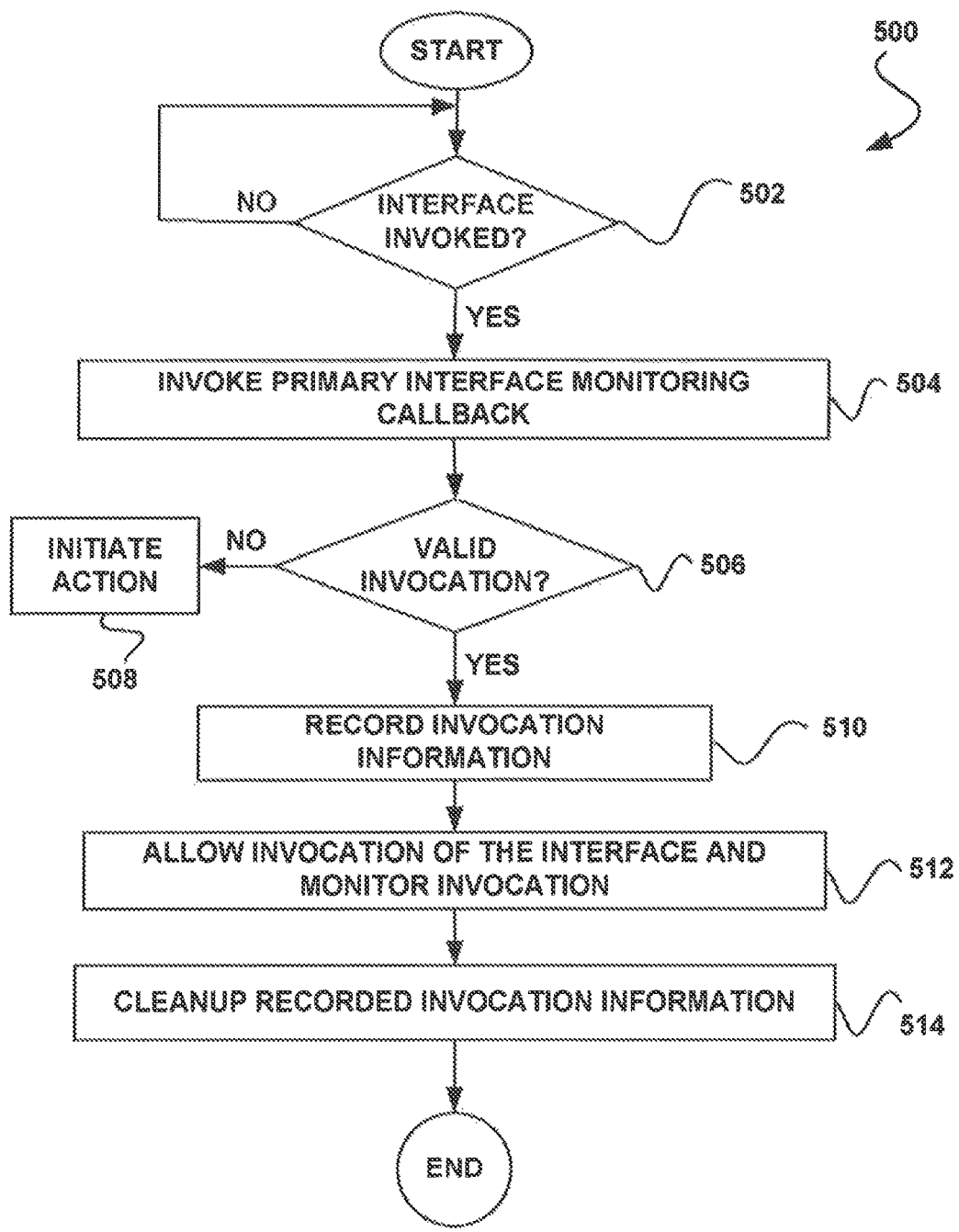
FIG. 5 shows a method for monitoring an invocation of an interface, in accordance with yet another embodiment.

FIG. 5 shows a method 500 for ordering portions of data and scanning the portions of data based on the order, in accordance with yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in decision 502, it is determined whether an interface is invoked. For example, it may be determined whether an initial portion of the interface is invoked, a beginning portion of the interface is invoked, etc. Once it is determined that an interface has been invoked, a primary interface monitoring callback function is invoked, as shown in operation 504. Thus, invocation of the interface may optionally be paused, such that control from such invocation may be transferred to the primary interface monitoring callback function, and therefore a monitoring/analyzing system associated with such callback function.

The primary interface monitoring callback function may accordingly initiate monitoring and/or analysis of an execution of the interface. As shown, the primary interface monitoring callback may be utilized for determining whether the invocation of the interface is valid, as shown in decision 506. Such validity may be based on whether the invocation of the interface is associated with known unwanted code (e.g. malware within an executable image such as an application or device driver, malware hidden as a rogue, thread of execution, malware as a hidden portion of allocated memory invoked by hidden stack frames, etc.)

The validity of the invocation of the interface may be determined in any desired manner. For example, the validation may be performed utilizing buffer overflow detection, caller validation, parameter checking, etc. One example of validating an invocation of an interface utilizing buffer overflow detection is described in U.S. Pat. No. 6,412,071, entitled "Method for Secure Function Execution by Calling Address Validation," which is hereby incorporated by reference In addition, an example of validating an invocation of an interface utilizing caller validation is described in U.S. patent application Ser. No. 11/561,809 filed Nov. 20, 2006 and entitled "System, Method And Computer Program Product For Verifying Invocations Of Interfaces," which is also hereby incorporated by reference.

If it is determined that the invocation of the interface is not valid, an action may be initiated. Such action may include, for example, preventing execution of the interface, transmitting an alert, and/or any other action capable of being taken in response to a determination that the invocation of the interface is not valid. If, however, it is determined that the invocation of the interface is valid, invocation information is recorded. Note operation 510.

The invocation information may include any information associated with the invocation of the interface. In one embodiment, the invocation information may include an identifier of a particular entity (e.g. thread, lightweight thread, process, etc.) which initiated the invocation of the interface. Such identifier may include an address, name, executable module, and/or any other identifier capable of identifying an entity that invoked the interface.

Further, the invocation, information may be recorded by storing such information in a data structure (e.g. hash, tree, etc.). In one embodiment, the data structure may include a plurality of threads, such that an instance of an invocation of an interface may be associated with the particular thread causing such invocation. In another embodiment, each thread within the data structure may only be associated with information identifying a single invocation of an interface. Accordingly, the data structure may only represent interfaces currently invoked by such threads. Table 1 illustrates an exemplary data structure capable of recording invocation information. It should be noted that Table 1 is set forth for illustrative purposes only, and therefore should not be construed as limiting in any manner.

TABLE 1

| THREAD | INTERFACE INVOKED |
|---|---|
| Thread_01 | Interface_A |
| Thread_02 | Interface_B |
| Thread_03 | Interface_C |

Further, invocation of the interface is allowed and such invocation is monitored, as shown in operation 512. For example, the primary interface monitoring callback function may transfer control back to the interface, such that the interface may be executed. In one embodiment, if the primary interface monitoring callback function includes an in-line hook, such callback function may first execute code of the interface replaced by the in-line hook (i.e. by locating a storage location of such code) and may then transfer control to the interface.

In another embodiment, the interface may be executed utilizing structured exception handling. Thus, if execution of the interface results in an exception thrown outside of the interface, control may be returned to the primary interface monitoring callback function, therefore allowing cleanup of the recorded invocation information, as described below. To this end, execution of the interface may be allowed to continue if the invocation thereof is determined to be valid (decision 506).

In addition, the invocation of the interface may be monitored by monitoring and/or analyzing portions of internal code of the interface, one example of which will be described in more detail with respect to FIG. 6. Once execution of the interface is complete, the recorded invocation information is cleaned up, as shown in operation 514.

The recorded invocation information may be cleaned up by deleting, removing, etc. such recorded invocation information.

To this end, invocation of an interface may be monitored regardless of the manner in which the interface is invoked. For example, in one embodiment an interface may be monitored by altering a table of interface pointers such that invocation of such interface results in an execution transfer to a monitoring system. Thus, malware attempting to bypass such monitoring trigger by executing the interface directly instead of via the table of interface pointers may be prevented from completely evading an invocation of the monitoring.

Figure 6:
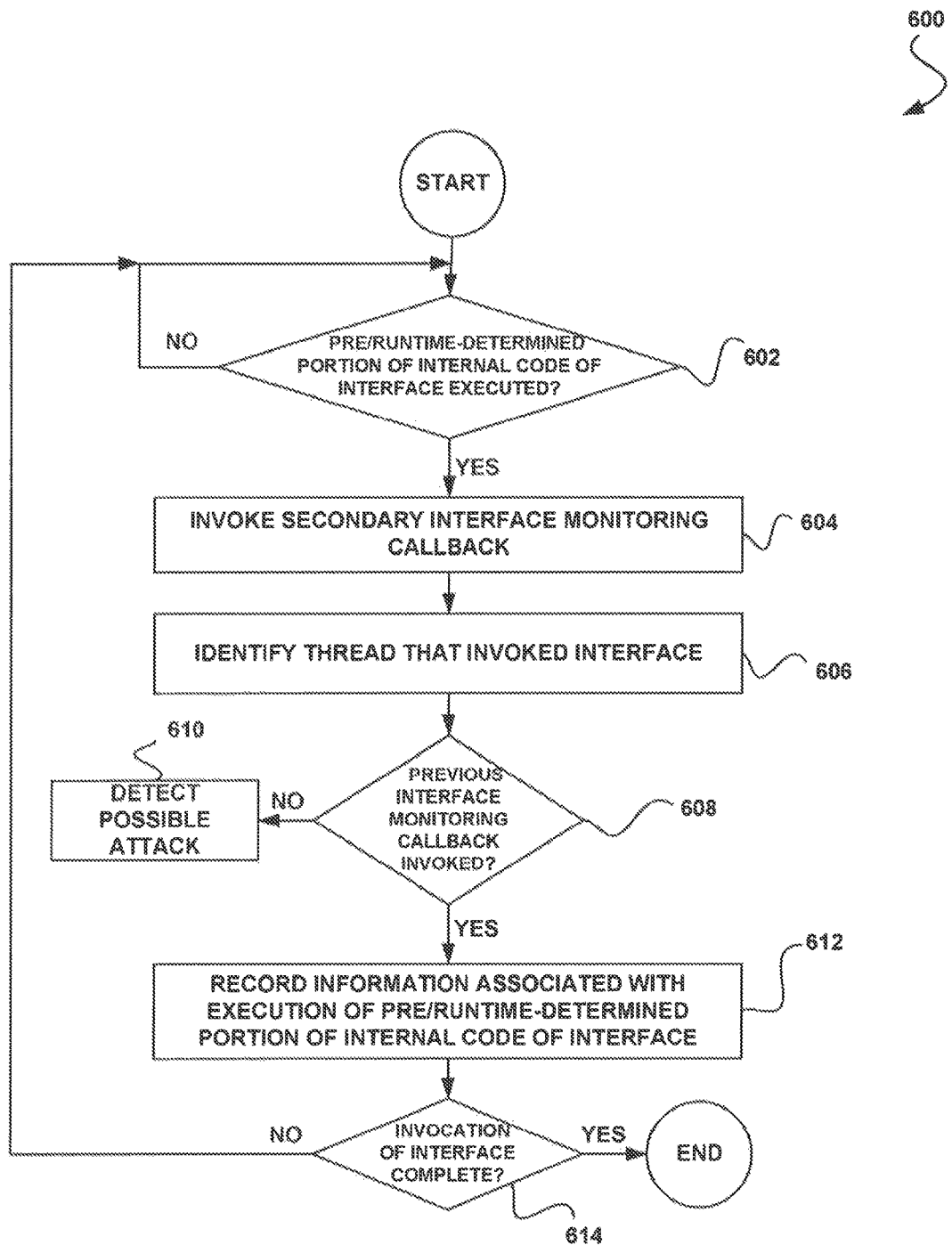
FIG. 6 shows a method for monitoring an invocation of an interface in response to the execution of a portion of internal code of the interface, in accordance with still yet another embodiment.

FIG. 6 shows a method 600 for allowing access to portions of data, in accordance with still yet another embodiment. As an option, the method 600 may be carried out in the context of the architecture and environment of FIGS. 1-5. For example, the method 600 may optionally be carried out during operation 512 of FIG. 5. Of course, however, the method 600 may be carried out in any desired environment. It should also be noted that the aforementioned definitions may apply during the present description.

As shown in decision 602, it is determined whether a pre/runtime-determined portion of internal code of an interface is executed. In the context of the present description, the portion of internal code may be predetermined and/or determined at runtime. In one embodiment, the runtime determined portion of internal code may be determined during operation 510 of FIG. 5, but of course may also be determined at any time prior to a determination of whether such portion of internal code has been executed. In this way, callback functions associated with portions of internal code may be runtime configurable (e.g. added, removed, modified, etc.).

Once it is determined that a pre/runtime-determined portion of internal code has been executed, a secondary interface monitoring callback function is invoked, as shown in operation 604. Such secondary interface monitoring callback function is utilized for identifying a thread that invoked the execution of the portion of internal code of the interface. Note operation 606. The identified thread may then be utilized for identifying recorded invocation information associated therewith. For example, the thread may be looked up in a data structure for identifying the recorded invocation information, as described above with respect to operation 510 of FIG. 5.

Further, it is determined whether a previous interface monitoring callback function was invoked, as shown in decision 608. In one embodiment, it may be determined whether recorded invocation information is associated with the thread. Such recorded invocation information may identify whether an initial portion of the interface and/or any other portion of internal code of the interface has been invoked. In this way, it may be determined whether an initial portion of the interface and any other pre/runtime-determined portions of internal code previous to the portion of internal code determined to be executed (decision 602) have already been executed.

If it is determined that an expected previous interface monitoring callback function has not been invoked, a possible attack is detected (operation 610). For example, the lack of invocation of a previous interface monitoring callback function may indicate that malware invoking execution of the interface is attempting to bypass monitoring of the interface. Optionally, any desired action may be taken in response to such detection (e.g. prevent execution of interface, transmit alert, etc.). Thus, in various embodiments, execution of the internal portion of code may be identified as potentially unwanted if it is determined that an initial portion of the interface was not invoked and/or any other previous portion of internal code was not invoked.

Still yet, if it is determined that all previous interface monitoring callback functions have been invoked, information associated with the execution of the pre/runtime-determined portion of internal code of the interface is recorded. Note operation 612. Such information may be stored in association with the thread invoking the execution of such portion of internal code. Accordingly, for each thread, information associated with each invoked callback function may be recorded, such that the information may be utilized by subsequently invoked callback functions in the manner described above with respect to decision 608.

In addition, it is determined whether the invocation of the interface is complete, as shown in operation 614. In one embodiment, it may be determined whether any additional code associated with the interface is to be executed. In another embodiment, it may be determined whether there is another pre/runtime-determined portion of internal code of the interface that is to be executed.

If it is determined that invocation of the interface is not complete, it is determined whether a next pre/runtime-determined portion of internal code of the interface has been executed (decision 602). If, however, it is determined that invocation of the interface is complete, the method 600 terminates. Thus, execution of a portion of internal code may be identified as potentially unwanted based on monitoring and/or analyzing an aspect of the invocation of the interface utilizing callback functions associated with internal code of the interface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying execution of an interface, including identifying by utilizing a callback function that a code segment internal to the interface has been executed;
   in response to the execution of the interface, determining whether the interface was executed as a result of executing a defined entry point of the interface, the entry point located logically before the code segment;
   determining that the execution of the interface is malicious based upon the determination that the interface was executed as a result of executing the code segment prior to executing the defined entry point of the interface; and
   in response to the determination that the execution is malicious, initiating an action including at least one of:
   preventing further execution of the interface;
   transmitting an alert; or
   recording information associated with the execution of the interface.

2. The method as recited in claim 1, further comprising predetermining that the code segment is to be monitored for execution with respect to the entry point.

3. The method as recited in claim 1, wherein the code segment is determined during runtime by:
   determining a starting address of the interface; and
   determining a size of the interface.

4. The method as recited in claim 1, and further comprising determining whether the execution is malicious further based upon whether the interface includes a single entry point.

5. The method as recited in claim 1, further comprising determining whether the execution of the code segment is malicious based upon a determination that the entry point of the interface was not invoked.

6. The method as recited in claim 1, further comprising verifying the callback function by determining whether a memory address associated with the callback function is located within code of the interface.

7. A computer program product embodied on a non-transitory computer readable medium, comprising instructions that, when loaded and executed by a processor, cause the processor to:
identify execution of an interface, including identifying by utilization of a callback function that a code segment internal to the interface has been executed;
in response to the execution of the interface, determine whether the interface was executed as a result of execution of a defined entry point of the interface, the entry point located logically before the code segment;
determine that the execution of the interface is malicious based upon the determination that the interface was executed as a result of execution of the code segment prior to the execution of the defined entry point of the interface; and
in response to the determination that the execution is malicious, initiate an action, the action including at least one of:
prevention of further execution of the interface;
transmission of an alert; or
recordation of information associated with the execution of the interface.

8. A system, comprising:
a hardware processor;
computer-readable instructions executable by the processor to identify execution of an interface by utilization of a callback function, including identifying that a code segment internal to the interface has been executed;
in response to the execution of the interface, computer-readable instructions executable by the processor to determine whether the interface was executed as a result of execution of a defined entry point of the interface, the entry point located logically before the code segment;
computer-readable instructions executable by the processor to determine that the execution of the interface is malicious based upon the determination that the interface was executed as a result of execution of the code segment prior to the execution of the defined entry point of the interface; and
in response to the determination that the execution is malicious, computer-readable instructions executable by the processor to initiate an action, the action including at least one of:
prevention of further execution of the interface;
transmission of an alert; or
recordation of information associated with the execution of the interface.

9. The computer program product of claim 7, further comprising instructions for causing the processor to predetermine that the code segment is to be monitored for execution with respect to the entry point.

10. The computer program product of claim 7, further comprising instructions for causing the processor to determine the code segment to be monitored during runtime by:
determining a starting address of the interface; and
determining a size of the interface.

11. The computer program product of claim 7, further comprising instructions for causing the processor to determine whether the execution is malicious further based upon whether the interface includes a single entry point.

12. The computer program product of claim 7, further comprising instructions for causing the processor to determine whether the execution is malicious based upon a determination that the entry point of the interface was not invoked.

13. The computer program product of claim 7, further comprising instructions for causing the processor to:
identify that another portion of internal code of the interface was invoked; and
determine that the execution is malicious based at least upon an identification that the other portion of internal code was invoked prior to execution of the code segment;
wherein the code segment is located logically before the other portion of internal code.

14. The computer program product of claim 7, further comprising instructions for causing the processor to
verify the callback function by determining whether a memory address associated with the callback function is located within code of the interface.

15. The system of claim 8, wherein the computer-readable instructions executable by the processor to identify execution of an interface is further executable by the processor to configure the system to predetermine that the code segment is to be monitored for execution with respect to the entry point.

16. The system of claim 8, wherein the computer-readable instructions executable by the processor to identify execution of an interface is further executable by the processor to determine the code segment to be monitored during runtime by:
determining a starting address of the interface; and
determining a size of the interface.

17. The system of claim 8, wherein the computer-readable instructions executable by the processor to determine that the execution is malicious is further executable by the processor to determine whether the execution is malicious further based upon whether the interface includes a single entry point.

18. The system of claim 8, wherein the computer-readable instructions executable by the processor to determine that the execution is malicious is further executable by the processor to determine whether the execution is malicious based upon a determination that the entry point of the interface was not invoked.

19. The system of claim 8, wherein:
the computer-readable instructions executable by the processor to identify execution of an interface is further executable to identify that another portion of internal code of the interface was invoked; and
the computer-readable instructions executable by the processor to determine that the execution is malicious is further executable to determine that the execution is malicious based at least upon an identification that the other portion of internal code was invoked prior to execution of the code segment;
wherein the code segment is located logically before the other portion of internal code.

20. The system of claim 8, wherein the computer-readable instructions executable by the processor to determine that the execution is malicious is further executable by the processor to
verify the callback function by determining whether a memory address associated with the callback function is located within code of the interface.

\* \* \* \* \*